Mar. 3, 1925.
G. E. ANDERSON
HYDROMETER BULB
Filed March 24, 1923
1,528,521
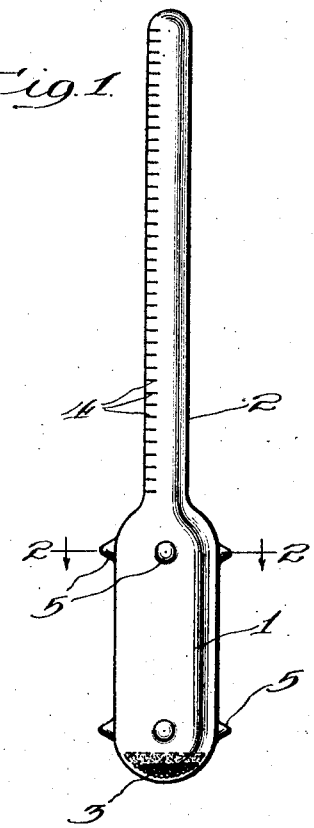
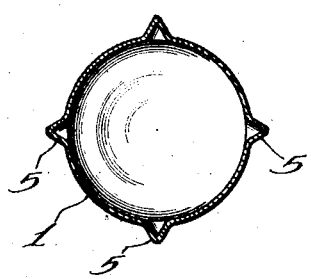
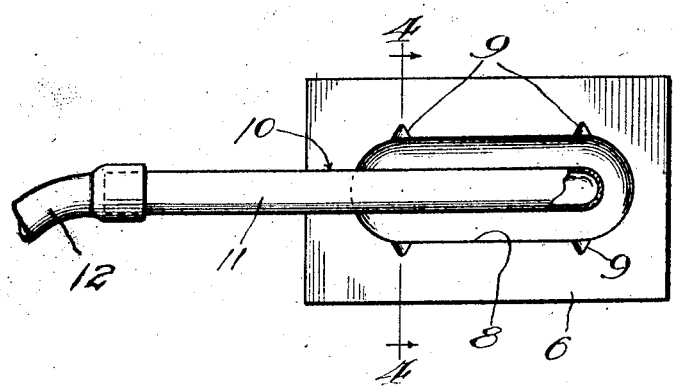
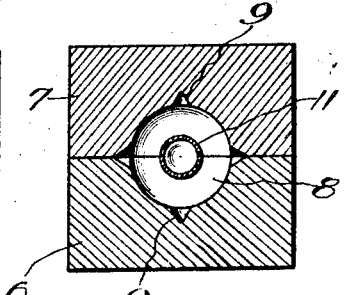
Inventor: George E. Anderson,
by Wm F Freudenreich Atty
Witness:

Patented Mar. 3, 1925.

1,528,521

UNITED STATES PATENT OFFICE.

GEORGE E. ANDERSON, OF CHICAGO, ILLINOIS.

HYDROMETER BULB.

Application filed March 24, 1923. Serial No. 627,387.

*To all whom it may concern:*

Be it known that I, GEORGE E. ANDERSON, a citizen of the United States, residing at Chicago, county of Cook, State of Illinois, have invented a certain new and useful Improvement in Hydrometer Bulbs, and declare the following to be a full, clear, and exact description of the same, such as will enable others skilled in the art to which it pertains to make and use the same, reference being had to the accompanying drawing, which forms a part of this specification.

My invention relates to hydrometers of the type in which the float is located in a tube not much larger in diameter than the bulbous portion of the float, so that means must be provided to hold such bulbous portion out of contact with the surrounding walls; such means usually taking the form of small projections distributed around the exterior of the bulbous portion of the float.

Heretofore it has been the custom to manufacture these floats in various ways and then to apply the points or projections thereto. In order that the float may be properly located in the co-operating tube or casing which contains the liquid to be tested, it is necessary that the points or projections on the float be uniform in height. Furthermore, in order to permit the floats to be readily calibrated in large quantities, it is necessary that one float be exactly like another and not vary therefrom in size, weight or distribution of weight. This is particularly true in the case of floats in which the bulbs are made and then attached to previously graduated stems, ballast being introduced into the floats mainly for the purpose of making them heavy at their lower ends, but also for the purpose of compensating for any inaccuracy in the calibration. Even if the bulbs were of uniform character at the beginning, the application thereto of bits of molten glass to form projections, in addition to causing breakage and consequent loss, is almost certain to create such lack of uniformity throughout any number of floats, so that pains must be taken to adjust the weight of each float. As a result, floats made in the ordinary way have projections of unequal height because of the impossibility accurately to measure the amount of heated glass applied to a float in the time that can be given to this operation in the manufacture of commercial devices; and, if they are made so as to give accurate readings, the cost of calibrating them will have been considerable, due to the care that must be taken with each individual float.

The object of the present invention is to produce floats of the character described in such a manner that any desired number may be produced quickly and cheaply, with the assurance that they will all be exactly alike.

In carrying out my invention I form the bulb of a float out of a tube of glass which is closed at one end, heated, and then expanded, by blowing air into the same, into a mold having a cavity the shape of the desired external contour, including the projections, of the bulb or enlargement. In this way, by selecting glass tubes of uniform character, and controlling the temperature and pressure of the air used to expand the tubes, the bulbs will not only be uniform in character, but the walls will be of uniform thickness throughout each bulb, instead of being thin walls having abruptly thickened spots where the lumps of glass forming the projections are fused to the same; because the projections are formed by forcing the walls of the bulb outwardly into small depressions leading from the mold cavity, and therefore the projections are simply small inverted cups or hollow domes. Being uniform in character, it is a simple matter to weight and calibrate floats containing my improved bulbs. Furthermore, because of the uniformity of the thickness of the glass in the bulbs and the absence of thick spots or lumps produced by applying molten glass after the completion of the bodies of the bulbs, my improved bulbs are not subjected to the internal stresses of the old types, and are therefore not so easily broken, either before or during service, as the latter.

The various features of novelty whereby my invention is characterized will hereinafter be pointed out with particularity in the claims; but for a full understanding of my invention and of its objects and advantages, reference may be had to the following detailed description taken in connection with the accompanying drawing, wherein:

Figure 1 is an elevation of hydrometer bulb made in accordance with my invention;

Fig. 2 is a section, on an enlarged scale, on line 2—2 of Fig. 1;

Fig. 3 is a plan view of the lower half of a mold containing a glass tube about to be expanded into the mold to form the bulb portion of a float; and Fig. 4 is a section taken approximately on line 4—4 of Fig. 3 showing, also, the upper half of the two-part mold.

Referring to the drawing, 1 represents the enlargement or bulb and 2 the stem of a hydrometer float, of any usual size or shape; part 1 containing in the lower end thereof a quantity of ballast 3, which may conveniently be very small shot; and the stem being provided with suitable graduations 4 of a kind and number depending on the use to which the float is to be put. Distributed about the enlarged portion or bulb of the float are any desired number of small conical projections 5. Externally the float may have the same appearance as any of the various floats for this purpose heretofore made; the important difference being that the bulb is accurately made as to size, weight and thickness of wall, while the projections are not solid lumps of glass but, as best shown in Fig. 2, are inverted cups whose walls are of the same thickness as the walls of the bulb.

In making one of my improved bulbs I first produce a mold made of any desired number of sections, the mold illustrated being in two sections 6 and 7; the mold having a cavity 8 of the size and shape of the exterior of the bulb to be formed; and there being small depressions 9 opening out of the mold cavity at the points where projections on the exterior of the bulb are desired. These depressions will of course be so located as not to interfere with the lifting of the completed product out of the mold after the mold has been opened. A cylindrical passage 10 extends from one end of the mold cavity outwardly through the adjacent wall of the mold; this passage being coaxial with the longitudinal axis of the mold cavity and being of approximately the same diameter as the tubes out of which the bulbs are to be blown.

Having the mold just described, I take a glass tube 11, close it at one end, apply an air conduit to the other end, and then heat the tube along the closed end for a distance about equal to the length of the mold cavity. The heated portion of the tube is laid in the mold with the inner or closed end preferably spaced apart somewhat from the corresponding end of the mold cavity, and air under pressure is then blown into the tube through the air conduit; the temperature of the air and the pressure being regulated so as to insure that the heated portion of the tube will be expanded to fill the mold cavity and the depressions opening outwardly therefrom before the glass has an opportunity to cool. The mold is then opened and the completed bulb lifted out. The tube is then heated at some distance beyond the bulb and the bulb is cut off. The operation of cutting off the bulb closes the free end of the remainder of the tube, so that the latter is ready to be inserted in the mold to form still another bulb. After the bulbs have been completed the stems may be applied in any usual or suitable manner, and the floats thus formed may be weighted and calibrated in any usual or suitable manner.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A hydrometer float comprising a bulb and stem, said bulb having the walls thereof pressed outwardly at various points to form small hollow projections.

2. A hydrometer float comprising a bulb and stem, said bulb having the walls thereof pressed outwardly at various points to form small hollow projections, whose walls are of the same thickness as the walls of the bulbs.

In testimony whereof I sign this specification.

GEORGE E. ANDERSON.